June 26, 1956 — J. L. EVERSOLE — 2,752,170
TRAILER HITCH WITH RETRACTIBLE GUARD
Filed Oct. 30, 1953 — 2 Sheets-Sheet 1
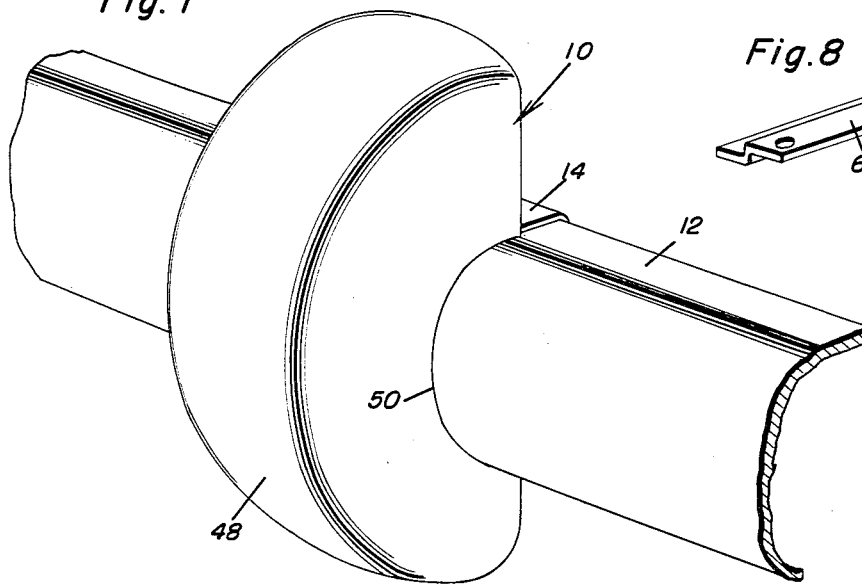
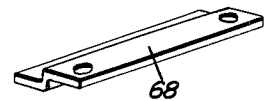
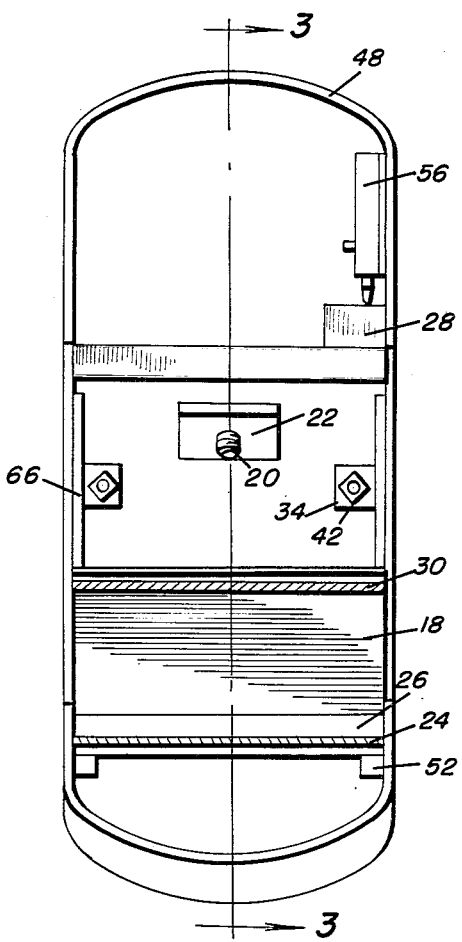
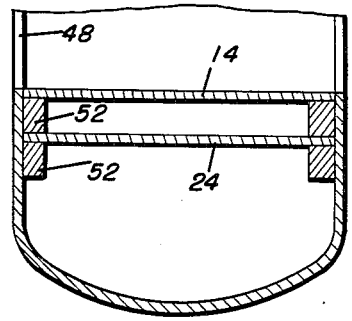
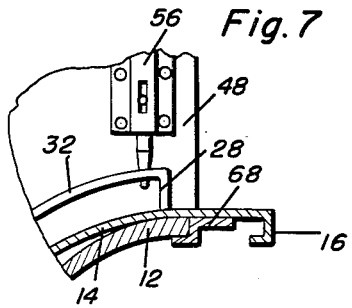
James L. Eversole
INVENTOR.

June 26, 1956  J. L. EVERSOLE  2,752,170
TRAILER HITCH WITH RETRACTIBLE GUARD
Filed Oct. 30, 1953  2 Sheets-Sheet 2

James L. Eversole
INVENTOR.

United States Patent Office 2,752,170
Patented June 26, 1956

2,752,170

TRAILER HITCH WITH RETRACTIBLE GUARD

James L. Eversole, Gibsonburg, Ohio

Application October 30, 1953, Serial No. 389,332

2 Claims. (Cl. 280—507)

This invention relates to a trailer hitch, and more specifically provides a trailer hitch in combination with a bumper guard and has for its principal object to provide a trailer hitch supported by a bumper of a motor vehicle or the like, with a bumper guard adapted to overlie and conceal the hitch construction when a trailer is not hitched to the motor vehicle thereby enhancing the appearance of the bumper as well as protecting the trailer hitch.

Another object of this invention is to provide a guard for a bumper of a motor vehicle designed to conceal the trailer hitch construction when it is not in use and adapted to be locked in an angular plane below the hitch construction when a trailer is connected to the vehicle.

A further feature of this invention is to physically secure a guard to the bumper of a motor vehicle so as to conceal a trailer hitch assembly when in vertical position and permit the hitch to be utilized to support a trailer thereon when in a horizontal position below the hitch construction and at right angles to the vertical.

Yet another object of this invention is to provide a trailer hitch which may be attached to any bumper and which does not mar the surface of the bumper.

Another object of this invention is to provide a combination trailer hitch and bumper guide that is simple and inexpensive to manufacture, easily attached to the bumper of most cars and to enhance rather than impair the natural look of the bumper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the trailer hitch of this invention mounted upon a conventional bumper;

Figure 2 is an end view taken substantially along the reference line 2—2 of Figure 3, showing the details of construction of the trailer hitch;

Figure 4 is a transverse, vertical section taken substantially along section line 4—4 of Figure 3, showing the arcuate guide for the cover member;

Figure 7 is a detail section showing the details of a modified form of bracket member; and Figure 8 is a perspective detail view of the detachable jaw employed in the form of the invention as shown in Figure 7.

Referring now specifically to the drawings, it will be seen that the numeral 10 generally designates the trailer hitch and cover of this invention mounted upon a conventional and substantially channel shaped rear bumper 12 of an automobile.

Figure 3:
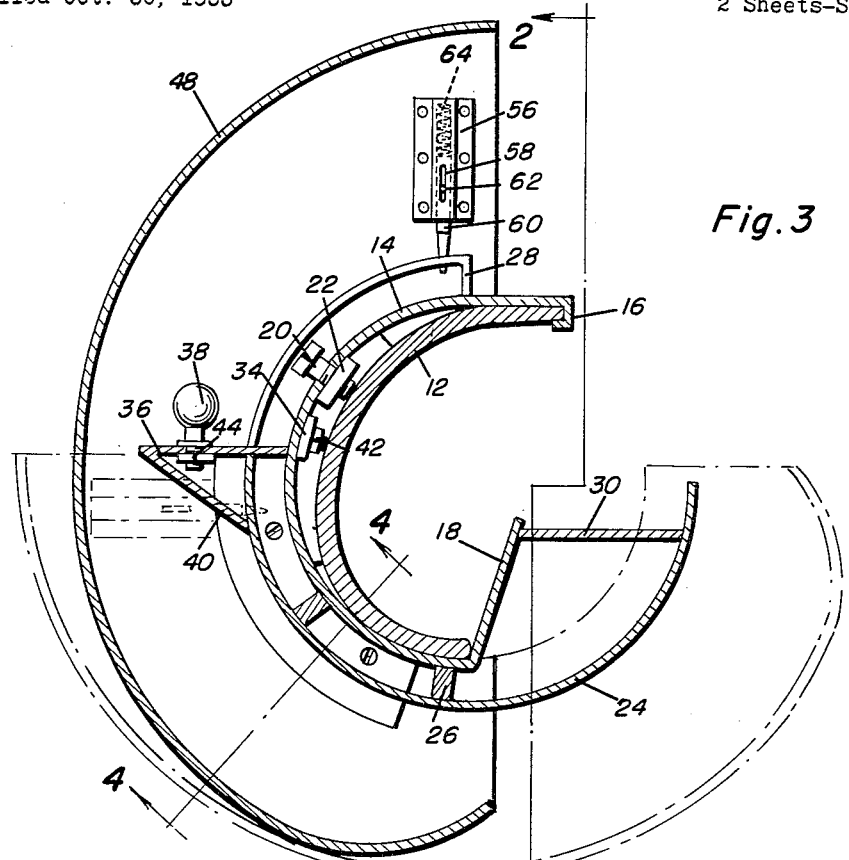
Figure 3 is a longitudinal, vertical section taken substantially along section line 3—3 of Figure 2 showing further details of construction of the trailer hitch.
Figure 5:
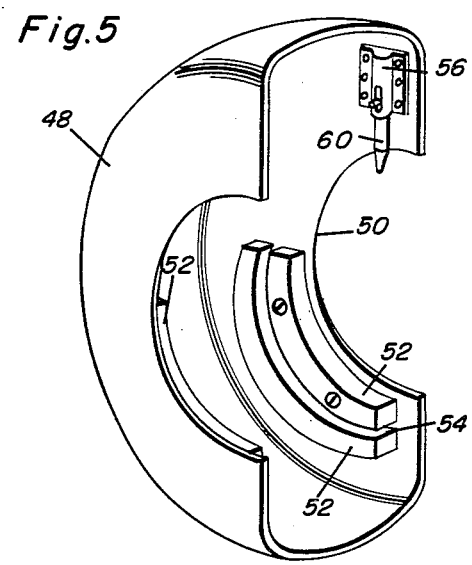
Figure 5 is a perspective detail view, showing the cover member and the locking detent.

Referring now specifically to Figure 3, it will be seen that the trailer hitch 10 includes a generally semi-circular bracket 14, having a hooked upper end generally indicated by the numeral 16, and an upturned or inturned lower portion indicated by the numeral 18. Adjacent the center portion of the semi-circular bracket 14, a setscrew 20 is provided having screw threaded attachments with a nut 22 secured to the inner surface of the bracket 14 and the setscrew 20 engages the outer surface of the bumper 12 thereby securely engaging the hooked end portion 16 and the inturned end portion 18 around the flanges of the bumper 12. A second arcuate or semi-circular bracket 24 is secured to the outer periphery of the bracket 14 in spaced relation thereto by spacers 26, an inturned upper end portion 28 and a relatively wide spacer 30 securing the inturned end 18 of the bracket 14 to the lower end of the bracket 24 thereby providing a double arcuate bracket for securing the device to the bumper 12. The upper end of the second bracket 24 includes a strip-like member 32 adjacent one edge of the bracket 14, thereby leaving a portion of the outer surface of bracket 14 free for access to the setscrew 20. Secured to the bracket 14 adjacent the setscrew 20 is an upturned end portion 34 of a shelf member 36 having an upstanding ball 38 thereon. An inwardly and downwardly extending brace 40 supports the end of the shelf from the outer surface of the second bracket 24. It will be seen that the shelf 36 is secured to the bracket 14 by a suitable fastening means 42 and the ball 38 is secured to the shelf means by a conventional fastening means as indicated by the numeral 44. It will be seen that the brackets 14, 24, extension 32, shelf 36 and brace 40 are all rigidly connected to each other.

Figure 6:
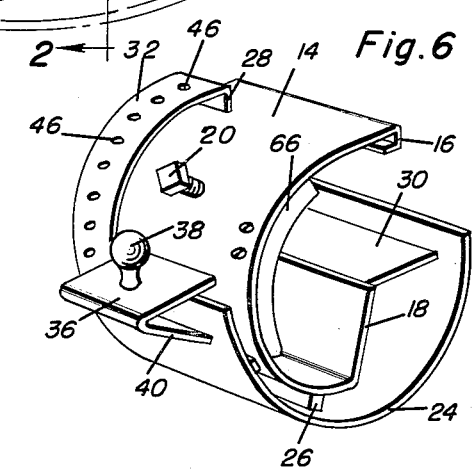
Figure 6 is a detail perspective view, showing the mounting brackets for the cover member.

As shown in Figure 6, the strip-like member 32 is provided with a plurality of spaced apertures 46 and the spacer members 26 and 30 are recessed from the lateral edge of the bracket 24 wherein the bracket 24 forms a guide for a purpose described hereinafter. A cover member 48 of generally semi-circular shape and having a channel cross-sectional shape with arcuate recesses 50 in one edge thereof is provided with a pair of spaced arcuate and elongated guide members 52 wherein the spaced members provide an arcuate slot 54 which fits over the edges of the lower portion of the bracket 24 wherein the slot 54 engage the arcuate edges of the bracket 24. It will be understood that the cover 48 may be pivoted about the bracket 24 with the edges of the bracket riding in the groove 54 between the arcuate guide 52. Provided adjacent the upper end of the cover 48 and secured to one leg of the channel shaped member is a bracket 56 having a bore with a slot 58 in one edge thereof slidably receiving a plunger 60 having a projecting lug 62 in the notch 58 and projecting therebeyond wherein a handle is provided for manipulating the plunger 60 which has a pointed end portion adapted to engage selective apertures 46. The inner end of the plunger 60 is engaged by a coil spring 64 which urges the plunger outwardly of the bracket 56. It will be understood that by suitable pressure on the handle 62 the plunger 60 may be retracted and disengaged from the apertures 46 wherein the cover 48 may be pivoted about the bracket 24 from a position as shown in phantom in Figure 3 to a position wherein the trailer hitch brackets are concealed.

The operation of the device will be readily understood. The bracket 14 is secured over the flanges of the bumper 12 in an obvious manner and the setscrew 20 is tightened thereby drawing the hooked end portion 16 and the upturned end portion 18 rigidly against the bumper. It will be noted that base 66 may be secured to the inner surface of the bracket 14 by suitable fastening means thereby enclosing the portion of the bumper. It will be noted that the bracket 24 is rigid with the bracket 14 and the cover member is placed over the edges of the bracket 24 by an arcuate sliding movement and with the plunger 60 engaging the uppermost aperture 46, the cover 48 is in a substantially vertical position wherein the trailer hitch ball 38 and the brackets 14 and 24 are concealed from view thereby enhancing the appearance of the bumper and the vehicle in general. By manipulating the plunger 60 against the spring 64 the cover 48 may be swung downwardly in an arcuate manner thereby assuming a generally horizontal position wherein the trailer hitch ball 38 is uncovered thereby permitting the trailer hitch to be utilized by connecting a trailer thereto. When it is desired to use the device of this invention on a universal type attachment, a separable movable jaw 68 may be provided which may be secured to the inner surface of the bracket 14 in any conventional manner and spaced from the hooked end portion a sufficient amount to engage the flange of the bumper 12. Obviously, the various components of this invention may be constructed of any readily obtainable material and preferably material which is rust-proof, corrosion-resistant, strong and durable. The cover member 48 may be constructed of suitable stainless steel or chrome plated material wherein the cover member 48 resembles a bumper guard and enhances the appearance of the bumper 12 while protecting the trailer hitch ball 38 from the usual weather element and dirt and dust. It also protects the trailer ball from damage from bumpers of other vehicles and provides a rugged bumper guard in itself thereby protecting the trunk and other portions of the vehicle.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A trailer hitch comprising a semi-circular bracket adapted to be attached to a vehicle bumper, a ball member secured to said bracket, a cover member concealing said bracket and ball member and means slidably securing said cover to said bracket for moving said cover to a position covering said ball and bracket and a position providing access to said ball and bracket, said means includes a second semi-circular bracket secured in spaced relation to said first mentioned bracket, a pair of arcuate guide members secured to each side of said cover in closely spaced relation for slidably receiving the edges of said second bracket.

2. A trailer hitch comprising a semi-circular bracket adapted to be attached to a vehicle bumper, a ball member secured to said bracket, a cover member concealing said bracket and ball member and means slidably securing said cover to said bracket for moving said cover to a position covering said ball and bracket and a position providing access to said ball and bracket, said means includes a second semi-circular bracket secured in spaced relation to said first mentioned bracket, a pair of arcuate guide members secured to each side of said cover in closely spaced relation for slidably receiving the edges of said second bracket, said second bracket is provided with a plurality of arcuately spaced apertures and said cover is provided with a spring urged plunger selectively engageable with said apertures wherein said cover may be locked in adjusted position.

References Cited in the file of this patent

UNITED STATES PATENTS

| | | |
|---|---|---|
| D. 148,269 | Askins | Jan. 6, 1948 |
| 2,464,423 | Walkowiak | Mar. 15, 1949 |
| 2,510,782 | Johnson | June 6, 1950 |
| 2,595,711 | Schwork | May 6, 1952 |